United States Patent [19]

Kataoka et al.

[11] 4,440,513
[45] Apr. 3, 1984

[54] CHARACTER SHAPING DEVICE

[75] Inventors: Hiroyuki Kataoka; Yoshio Arai, both of Kanagawa, Japan

[73] Assignee: Fuji Xerox Co., Ltd., Tokyo, Japan

[21] Appl. No.: 356,544

[22] Filed: Mar. 9, 1982

[30] Foreign Application Priority Data

Mar. 12, 1981 [JP] Japan .................................. 56-34631

[51] Int. Cl.³ ............................................ G06K 9/00
[52] U.S. Cl. .................................. 400/165.1; 400/83; 400/110; 400/479; 400/484; 178/18; 382/13
[58] Field of Search ................. 400/17, 19, 76, 83, 400/84, 110, 165.1, 479, 484; 178/18, 30; 358/77, 78, 279, 287, 295; 382/10, 13, 41, 44, 45, 47, 48, 56, 69

[56] References Cited

U.S. PATENT DOCUMENTS

| | | | |
|---|---|---|---|
| 3,289,164 | 11/1966 | Rabinow | 382/47 |
| 3,462,737 | 8/1969 | Malaby | 382/47 |
| 3,684,828 | 8/1972 | Maher | 178/18 |
| 3,761,877 | 9/1973 | Fernald | 382/13 |
| 3,909,785 | 9/1975 | Howells | 382/13 |
| 3,975,592 | 8/1976 | Carvey | 178/18 |
| 4,024,500 | 5/1977 | Herbst et al. | 382/13 X |
| 4,124,871 | 11/1978 | Morrow | 358/77 X |
| 4,262,281 | 4/1981 | Buckle et al. | 382/13 |
| 4,318,096 | 3/1982 | Thornburg et al. | 178/18 X |
| 4,365,235 | 12/1982 | Greanias et al. | 400/110 X |

FOREIGN PATENT DOCUMENTS

| | | | |
|---|---|---|---|
| 53-136439 | 11/1978 | Japan | 382/13 |
| 55-38757 | 3/1980 | Japan | |
| 55-123776 | 9/1980 | Japan | 382/13 |
| 55-143681 | 11/1980 | Japan | 382/13 |
| 56-44969 | 4/1981 | Japan | 382/41 |

OTHER PUBLICATIONS

Article, "Computers with Character", Robert Trotter, Science News, vol. 120, Jul. 11, 1981, pp. 26–28.

*Primary Examiner*—Ernest T. Wright, Jr.
*Attorney, Agent, or Firm*—Sughrue, Mion, Zinn, Macpeak, and Seas

[57] ABSTRACT

A character shaping device includes a tablet or the like upon which characters are written or drawn, and a device for determing distribution functions for the character as projected in the x- and y-directions. From this information the "center of gravity" of the character is calculated, and the x- and y-dimensions of the character are detected to determine the character area. The image is then centered within a normalization area and enlarged or reduced in size according to scale factors dependent upon the relative dimensions of the character area and the normalization area, to obtain a well balanced and sized character which may then be printed along with other characters to form sentences on a printed document or the like.

8 Claims, 5 Drawing Figures

CHARACTER SHAPING DEVICE

BACKGROUND OF THE INVENTION

This invention relates to a device for forming or reproducing characters, and more particularly, to a character shaping device which can shape characters handwritten in various sizes and in various positions within a predetermined box, and locate the shaped character at a well-balanced position in the box.

Manual or electric-powered typewriters using type font have been widely employed as devices for shaping or copying characters. Recently, non-impact printers for Chinese characters which utilize electronic font have also been put into practical use.

However, ready-made type font is used in prior character forming devices, so that the operator is required to touch keys to input the characters one by one. The conventional devices are disadvantageous in that the necessary manual input work requires experience, skill and a long time and, in addition, inputting errors are likely.

SUMMARY OF THE INVENTION

In view of the foregoing problems in the prior art, an object of the present invention is to provide a character shaping device which can partially enlarge or reduce characters written by a drafter, and then shape and correct each handwritten character so as to have a predetermined size and center position, and then locate the character at a well-balanced position in a certain box one by one, without using a type font.

BRIEF DESCRIPTION OF THE DRAWING

In the following, the invention will be described in more detail with reference to the accompanying drawing, in which.

DETAILED DESCRIPTION OF THE PREFERRED EMBODIMENTS

Figure 1:
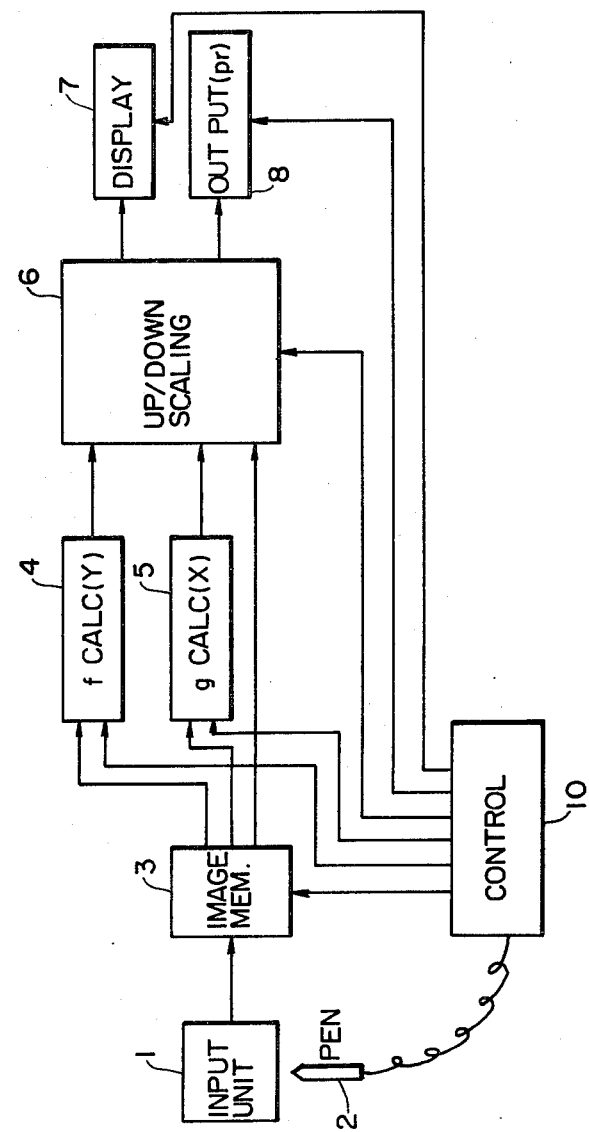
FIG. 1 is a block diagram showing one embodiment of the invention.

Referring now to the drawing, and in particular to FIG. 1, designated at 1 is an input unit, 2 is an input pen, 3 is an image memory, 4 is an f calculator for calculating the y-peripheral distribution function of the input data, 5 is a g calculator for calculating the x-peripheral distribution function, 6 is a unit for the up/down scaling of an input character, 7 is a display, 8 is an output (printing) unit, and 10 is a control device for controlling the operations of the above listed components.

At first, when a desired character is written using the input pen 2 on the surface of the input unit 1, such as a tablet, the thus input information is converted into an electrical signal for each element and then sent to the image memory 3 so as to be stored therein.

Figure 2:
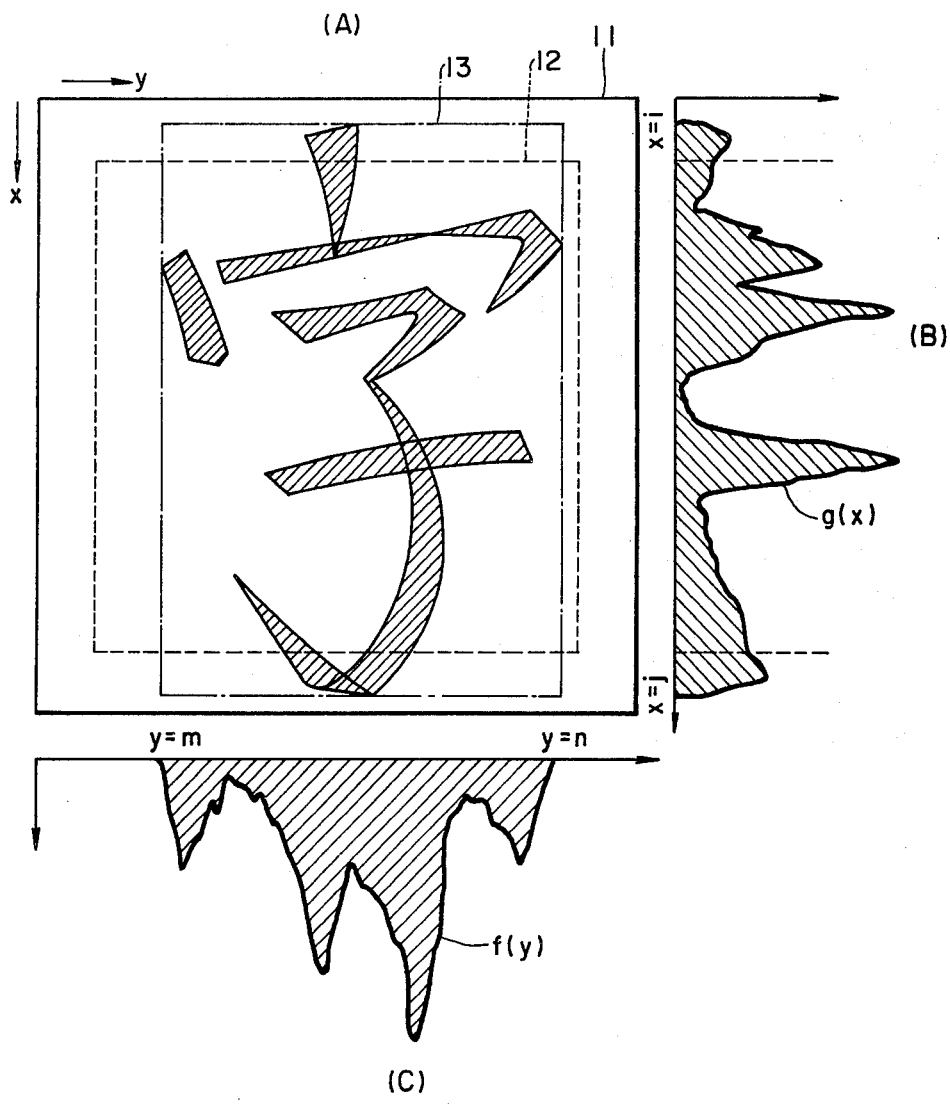
FIGS. 2 and 3 are plan views showing typical examples of handwritten characters, respectively.
Figure 3:
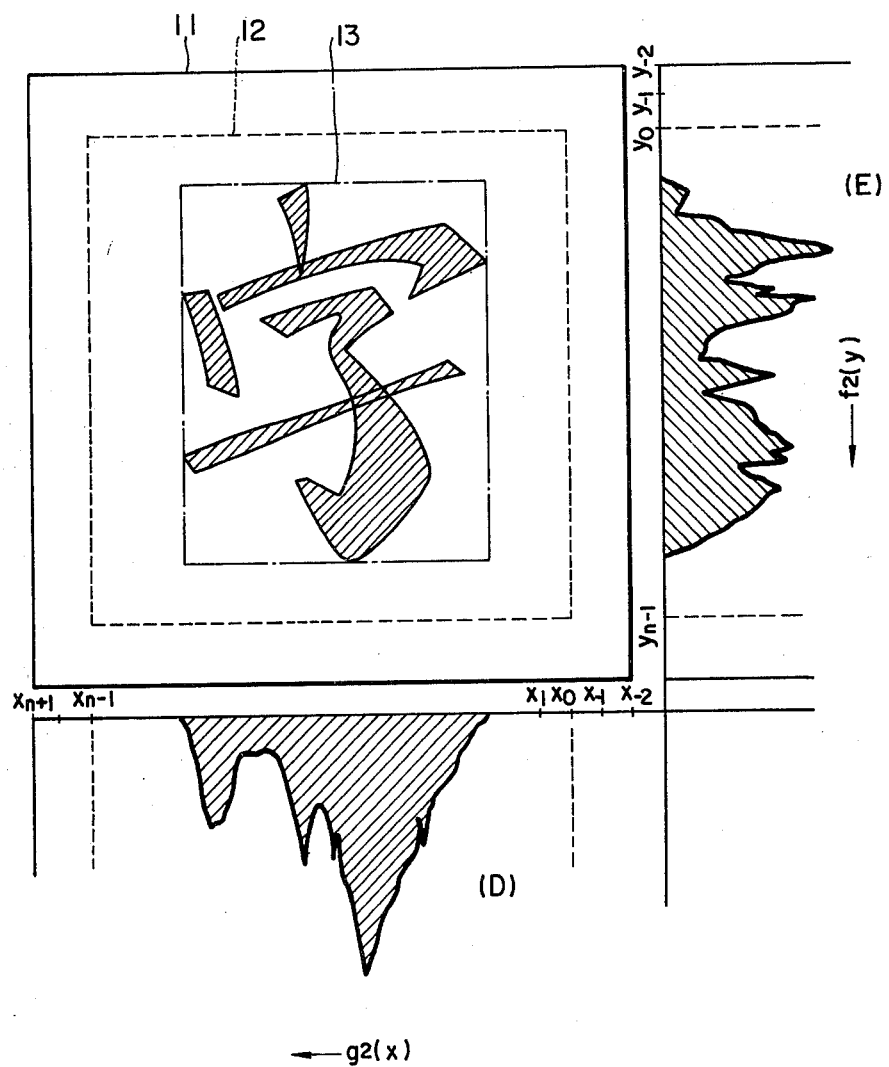

In FIGS. 2 and 3 are typical examples of a character written on the input unit (tablet) 1 in such a manner. A solid line box 11 represents a tablet area, a dotted line box 12 represents a normalization area in which the character is to be located with good balance, and the chain-dot box 13 represents the area in which the character has been written. FIG. 2 illustrates the case where the character (A) is written so large as to extend out of the normalization area, while FIG. 3 illustrates another case where the character has been written too small.

Now, the operation of the character shaping device according to the invention will be described with respect to the typical character shown in FIG. 2.

Binary image signals are stored in the image memory 3 in a pattern such as in FIG. 2. This image information is projected in both x- and y-directions, to obtain x- and y-peripheral distribution functions $g(x)$, $f(y)$ as illustrated by reference characters (B) and (C), respectively. To obtain the functions $g(x)$ and $f(y)$, it is sufficient to run scanning lines along both directions, and count the number of black picture elements on each of the scanning lines.

Such process is carried out by the f calculator 4 and the g calculator 5 in FIG. 1. It will be understood from the above that black picture elements are distributed in a pattern such as (B) of FIG. 2 in the range from $x=i$ to $x=j$ along the x-direction, while the black picture elements are distributed in a pattern such as (C) of FIG. 2 in a range from $y=m$ to $y=n$ along the y-direction.

In these calculators 4, 5, the actual character area 13 and the center of gravity position $\bar{x},\bar{y}$ in both directions are also calculated from the respective peripheral distribution functions $g(x)$, $f(y)$. Here, $\bar{x}$ and $\bar{y}$ can be obtained, for example, as weighted averages of $g(x)$ and $f(y)$, respectively.

Figure 4:
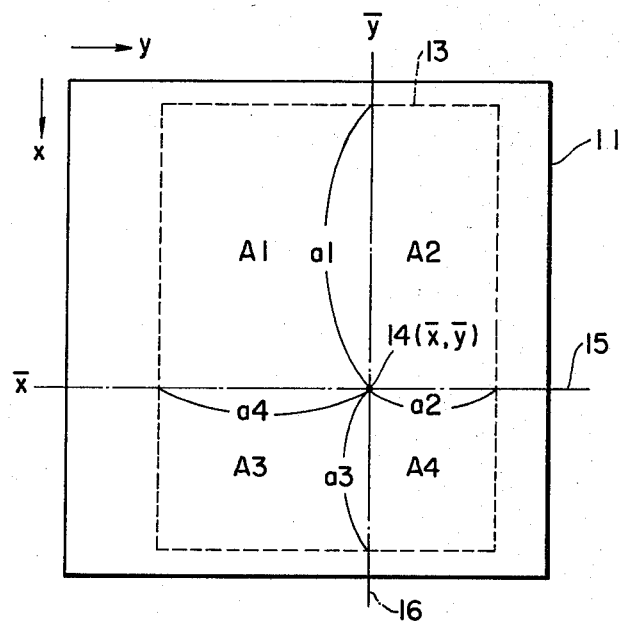
FIGS. 4 and 5 are diagrams of respective areas for explaining the operation of the character shaping device according to the invention.

Then, as shown in FIG. 4, a horizontal line 15 and a vertical line 16 passing through the center of gravity position 14 ($\bar{x},\bar{y}$) are determined in the scale-up/down unit 6. The actual character area 13 within the tablet area is divided into four areas A1 to A4 by the straight lines 15, 16. Subsequently, there are determined distances a1, a2, a3 and a4 from the center of gravity position 14 ($\bar{x},\bar{y}$) to each of the four sides of the character existing area 13.

On the other hand, the normalization area 12 is divided into four identical areas B1 to B4 by a horizontal line 17 and a vertical line 18 passing through the center 19 (x0,y0) thereof. Dimensions of the normalization area 12 are stored in a memory within the control device 10, and the distance b from the center 19 (x0,y0) to each side of the normalization area 12 is also stored therein.

Figure 5:
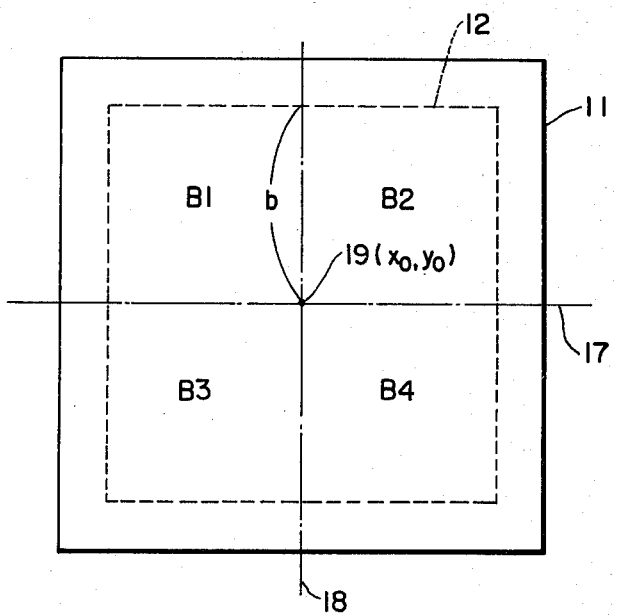

As will be apparent from a comparison between FIG. 4 and FIG. 5 when the areas A1 and A2 are multiplied by b/a1, the upper side of the actual character area 13 is made to coincide with the upper side of the normalization area 12. Similarly, when the remaining three sides are multiplied by b/a2, b/a3 and b/a4, respectively, those three sides of the character bounding area 13 can be made to coincide with the respective three corresponding sides of the normalization area 12.

In this manner, it is of course apparent that the center of gravity of the character, which has been fairly relocated in the normalization area 12 in the manner stated above, now coincides with the center 19 of the normalization area 12.

The foregoing calculation to obtain scale-up/down factors and the actual process for enlarging/reducing are carried out in the scale-up/down unit 6. Concrete techniques for reducing/enlarging have been previously proposed in Japanese Patent Laid-Open No. 55-38757 and are thus not described at length here.

Since the thus shaped and corrected character is indicated on the display 7, the degree of shaping can be observed, and hence the respective scale-up/down factors can be subjected to fine adjustment, as required.

The above shaping and correction process is repeated for each input character, and then the processed characters are output as a hard copy by the printing output unit, per each character or each sentence.

It is a matter of course that the shaped characters which are made to be well-balanced in the normalization area can also be obtained where the size of the handwritten character is too small as illustrated in FIG. 3, by similarly processing the input characters. In FIG. 3, (D) represents the x-peripheral distribution function g(x) and (E) represents the y-peripheral distribution function g(y) in such a case.

As will be apparent from the foregoing description, according to this invention, each of the several characters as handwritten by the drafter is shaped, corrected and then relocated in a predetermined areas so as to have a uniform size and substantially constant center of gravity position, thus enabling one to compose sentences including characters which are fairly arranged as a whole and can be read with no difficulty.

In this connection, in some cases some characters may come to have a poor arrangement due to the specialities thereof, when the center of gravity positions of those characters are made to coincide with the center of the normaliation area. To avoid such disadvantage, it is possible to make the center position of the normalization area movable so as to be optionally preset by manual operation, instead of fixing it at the geometrical center thereof.

What is claimed is:

1. A character shaping device, comprising: an image memory for reading a character in a tablet area and for storing said character as image information in the form of a binary signal for each of a plurality of picture elements; means for determining an x-peripheral distribution function and y-peripheral distribution function of said stored information, respectively; means for determining an area bounding said character and the center of gravity position of said character in respective directions from said x- and y-peripheral distribution functions; means for storing a preset normalization area within said tablet area, and the center position thereof; and means for altering said character bounding area to equate said character bounding area with said normalization area, and center said character within said normalization area, to produce a sized, centered character.

2. A character shaping device as claimed in claim 1, wherein said plurality of picture elements comprise a matrix of said picture elements arranged in rows and columns and wherein said binary signal for said each picture element has a first value when said each picture element represents a portion of said character and wherein said means for determining an x-peripheral distribution function and y-peripheral distribution function comprises: means for scanning said image information representing each said row of picture elements and for scanning said image information representing each said column of picture elements and for generating said x-peripheral distribution function in accordance with the number of said first value binary signals in each row and generating said y-peripheral distribution function in accordance with the number of said first value binary signals in each column.

3. A character shaping device as claimed in claim 2, wherein said character stored by said image memory is a handwritten character drawn in said tablet area.

4. A character shaping device as claimed in claim 3, further comprising means for displaying said sized, centered character for viewing by an operator.

5. A character shaping device as claimed in claim 1, said means for altering said character bounding area comprising scale up/down means for enlarging/reducing image information in an area between each side of said character bounding area and the center of gravity position thereof so as to make each side of said character bounding area coincide with a corresponding side of said normalization area.

6. A character shaping device as claimed in claim 5, said scale-up/down means enlarging/reducing said image information according to scale factors obtained by dividing the distance from the center of said normalization area to each side thereof by the distance from said center of gravity position of said character bounding area to a corresponding side thereof.

7. A character shaping device as claimed in claim 6, wherein said center position of said normalization area may be varied from the geometric center thereof.

8. A character shaping device as claimed in claim 6, further comprising printing means for printing said sized, centered characters in hard copy form.

* * * * *